United States Patent [19]

Ross et al.

[11] Patent Number: 4,466,190
[45] Date of Patent: Aug. 21, 1984

[54] COORDINATE MEASURING MACHINE

[75] Inventors: Günther Ross, Oberndorf; Manfred Schiementz, Epfendorf, both of Fed. Rep. of Germany

[73] Assignee: Mauser-Werke Oberndorf GmbH, Fed. Rep. of Germany

[21] Appl. No.: 391,403

[22] Filed: Jun. 23, 1982

[30] Foreign Application Priority Data

Jun. 30, 1981 [DE] Fed. Rep. of Germany ....... 3125681

[51] Int. Cl.$^3$ .............................................. G01B 5/00
[52] U.S. Cl. .................................. 33/1 M; 33/174 R
[58] Field of Search ............ 33/174 R, 174 L, 174 P, 33/174 H, 1 M, 1 AA, 169 R, 172 L, 172 R; 248/679, 637, 678, 664, 652, 646; 212/218, 219

[56] References Cited

U.S. PATENT DOCUMENTS 2,859,530 11/1958 Renaud ........................ 33/174 L X
3,840,993 10/1974 Shelton ............................. 33/1 M

FOREIGN PATENT DOCUMENTS 1599758 10/1981 United Kingdom ................. 33/1 M
658406 4/1979 U.S.S.R. ............................... 33/1 M Primary Examiner—Harry N. Haroian
Attorney, Agent, or Firm—McGlew and Tuttle

[57] ABSTRACT

The coordinate measuring machine comprises a basic frame structure including a bearing portion having a steel track with a crossbeam support for traveling on the steel track which carries a spindle sleeve. At least one of the frame structure parts comprises a cast resin concrete with a steel track embedded in the cast part. The composition of the synthetic resin concrete at least in the zones adjacent the steel track is such that the coefficient of thermal expansion of the concrete is substantially equal to that of the steel track.

9 Claims, 6 Drawing Figures

COORDINATE MEASURING MACHINE

FIELD AND BACKGROUND OF THE INVENTION

This invention relates in general to the construction of machines for measuring coordinates and in particular to a coordinate measuring machine including a frame structure having guide ways formed by steel embedded in a resin concrete.

An embodiment of a measuring machine similar to the invention is disclosed in German OS No. 24 13 335.

The supporting basic frame of such measuring machines is formed by a welded structure which is coated with metallic plates. This is expensive.

SUMMARY OF THE INVENTION

The invention is directed to a measuring machine having an improved supporting structure.

In accordance with the invention, the coordinate measuring machine comprises a basic frame structure with a crossbeam which includes a bearing portion in the form of a steel track which is embedded in a concrete structure of the basic frame. The basic frame comprises a synthetic resin concrete which is cast with the steel track embedded therein and the composition of the concrete is such that the coefficient of thermal expansion of the concrete will be substantially equal to that of the steel track.

Synthetic resin concretes are described in German OS NO. 27 43 396, for example. They substantially comprise a mixture of a granular stone material and of a synthetic resin as the binder. The employed synthetic resin may be an expoxy resin or an acrylic resin. By varying in the mixture the proportion of synthetic resin to granular stone material, desired properties of the concrete can be adjusted. More particularly, a suitable mixing ratio may result in a coefficient of thermal expansion of the set synthetic resin concrete, which is substantially equal to that of steel. The modulus of elasticity and the strength factors of the cast parts may also be adjusted to the specific requirements. As compared to a hydraulically setting concrete, a synthetic resin concrete has the further advantage of a small absorption of water.

Casting parts is a simple manufacture which also ensures that such a basic frame structure is dimensionally accurate. If large casting molds are to be avoided, the basic frame structure may be assembled of a plurality of cast parts. They are then connected to each other with the same synthetic resin concrete.

A basic frame structure of synthetic resin concrete absorbs well mechanical oscillations which are imposed to the basic frame structure. Such oscillation occur, for example, at the start and stop of the cross beam. The measuring operation can be performed only after the oscillations have damped out. Due to the favorable damping properties of the basic frame structure, the oscillations decay substantially faster than in a basic frame of welded steel. The cross beam can therefore travel at a higher speed than in prior art measuring machines.

Another advantage of the inventive basic frame structure is the low thermal conductivity of synthetic resin concrete. For this reason, short-time zonal temperature variations of the frame do not take effect as dimensional variations. Such temperature variations may be caused in the room accommodating machine by incident sum beams or by draft.

The inventive design is further advantageous in that the guide tracks of hardened steel can be fixed in the cast part in a simple and stable manner be inserting the part into the casting mold. Since the coefficient of thermal expansion of the synthetic resin concrete is adjusted to that of the guide elements, no mechanical stresses therebetween can occur under temperature variations.

In a development of the invention, the advantages of synthetic resin concrete may further be utilized by designing the bearing portion of the cross beam also as a part cast of synthetic resin concrete.

On the basic frame of prior art measuring machines, a granite plate is provided as the measuring table. To obtain such a table surface on the inventive basic frame structure, a development of the invention provides a layer of synthetic resin concrete with a particle size which is finer than that of the respective cast parts. In another embodiment, granite plates are embedded in a layer of synthetic resin concrete, to form the measuring table surface.

Further advantageous developments of the invention may be learned from the following description of different embodiments.

Accordingly it is an object of the invention to provide a coordinate measuring machine which comprises a basic frame structure which has a steel track bearing portion with cross beam means supported on the bearing portion for movement therealong and which carries a spindle sleeve and wherein at least one of the basic frame structure parts is made of a synthetic resin concrete having a steel track embedded in the concrete and with the concrete being such that the coefficient of thermal expansion is substantially equal to that of the steel.

A further object of the invention is to provide a coordinate measuring machine which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
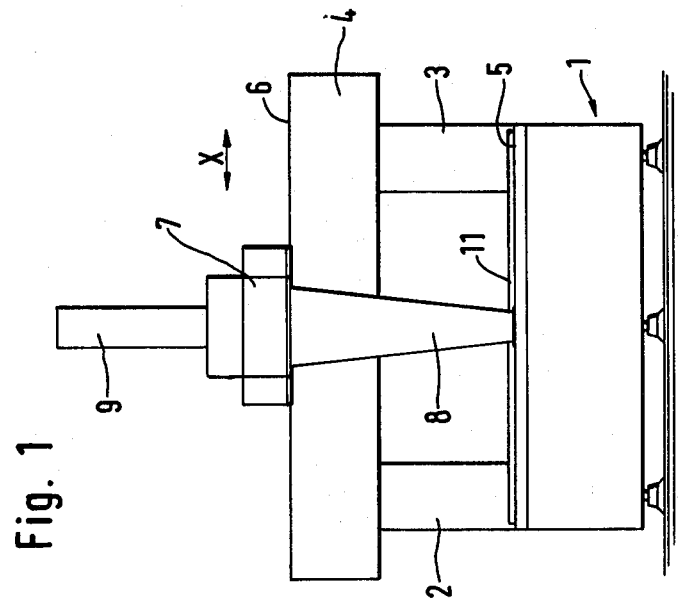
FIG. 1 is a front elevational view of a coordinate measuring machine constructed in accordance with the invention.

Referring to the drawings in particular the invention embodied therein comprises a coordinate measuring machine which comprises a basic frame structure 1 having a steel track bearing portion 5. Crossbeam means which in the embodiment of FIG. 1 comprises upright columns 2 and 3 and a head beam 4 with a crossbeam 7 movable along a guideway or steel track 6 and having an arm 8, bearing on a guideway including steel track 5 is mounted on the basic frame to provide movement for the crossbeam supported on the trackeways 5 and 6. At least one of the basic frame parts comprises a cast synthetic resin concrete having this bearing portion 5 or 6 which is embedded in the cast part. The composition of synthetic resin concrete at least in the zones adjacent the steel tracks 5 or 6 is such that the coefficient of thermal expansion of the concrete is substantially equal to that of the steel track.

The basic frame 1 and the columns 2 and 3, and headbeam 4 are cast of synthetic resin concrete. To reduce the weights cavities are provided in the cast parts, which may be filled with hard foam material. The mixture of synthetic resin concrete is made to have a coefficient of thermal expansion substantially equal to that of hardened steel.

In the basic frame 1 and in the headbeam 4, guideways 5 and 6 of hardened steel are embedded as tracks. On guideway 6, crossbeam 7 is supported which bears through arm 8 against guideway 5. Crossbeam 7 is mounted for traveling on guideways 5 and 6 in the X direction. A carriage 9 is provided on a bearing portion of crossbeam 7, supporting a spindle sleeve carrier 9' which is mounted for traveling in the Y direction. A spindle sleeve 10 is adjustable in the Z direction in its carrier 9'. Arm 8 and the bearing portion of crossbeam 7 may also be designed as parts cast of synthetic resin concrete.

Basic frame 1 at the same time forms a measuring table. The surface of the measuring table is formed by a layer 11 of synthetic resin which is deposited on the cast basic frame 1. The particle size of the granular stone material of concrete layer 11 is smaller than that of underlying basic frame 1, to be able to obtain a very smooth surface. If it is desired to give the measuring surface a granitic aspect, corresponding coloring matter is added to the synthetic resin concrete.

The measuring table surface may also be formed by granite plates placed on cast basic frame 1 and connected thereto by a layer of synthetic resin concrete of such composition that the layer elastically compensates for the differences in thermal expansion between the basic frame and the granite plates.

Figure 2:
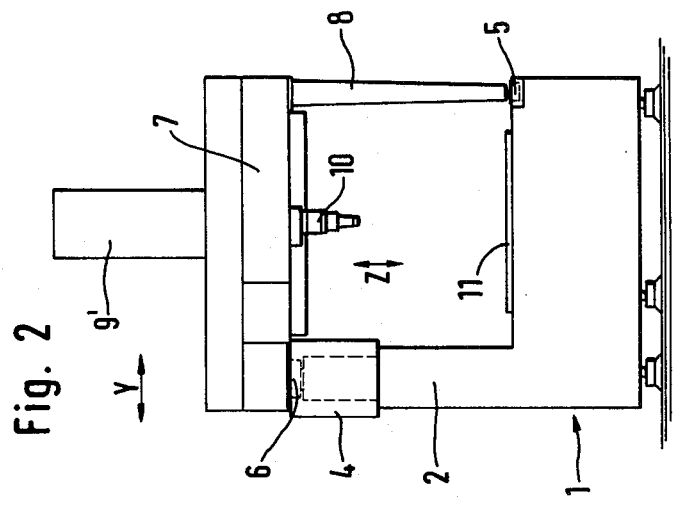
FIG. 2 is a side elevational view of the machine shown in FIG. 1.
Figure 3:
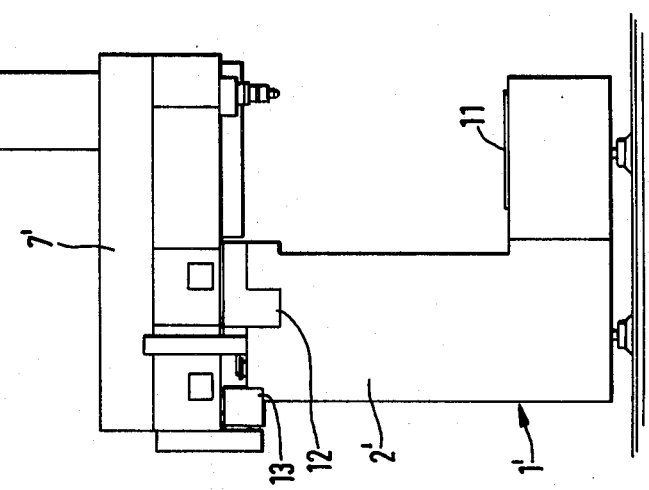
FIG. 3 is a view similar to FIG. 1 of another embodiment of the invention.
Figure 4:
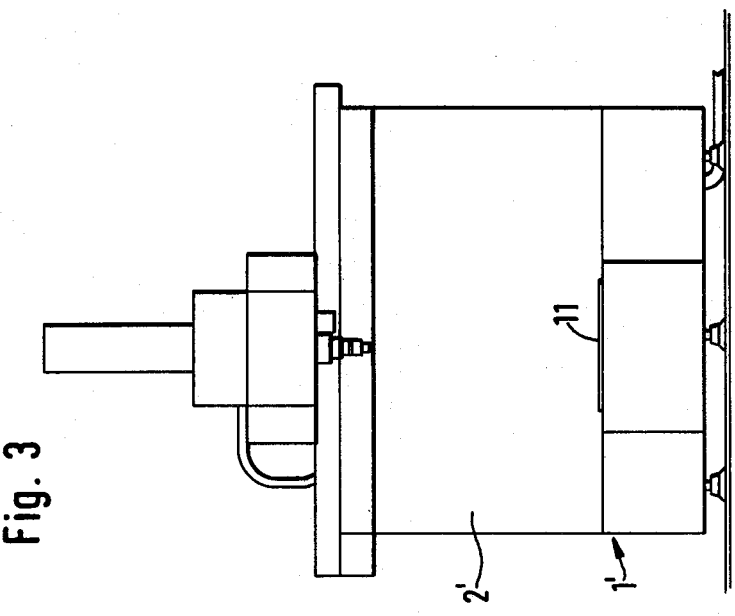
FIG. 4 is a side elevational view of the embodiment shown in FIG. 3.

In the measuring machine shown in FIGS. 3 and 4, a basic frame 1' supports on a side thereof a single upright member 2'. On the top of member 2', guideways 12 and 13 for crossbeam 7' are embedded. Basic frame 1' is designed in the same way as in the embodiment of FIGS. 1, 2.

Figure 6:
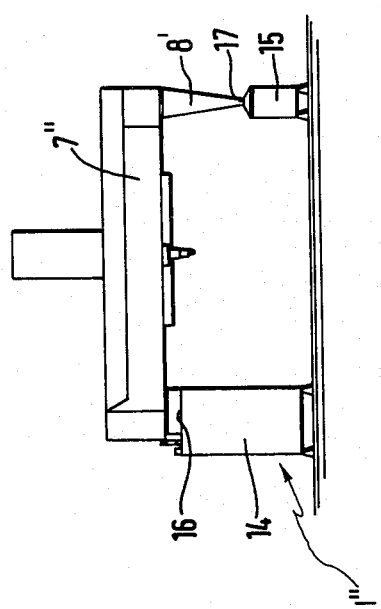
FIG. 6 is a view of the embodiment shown in FIG. 5 in side elevation.
Figure 5:
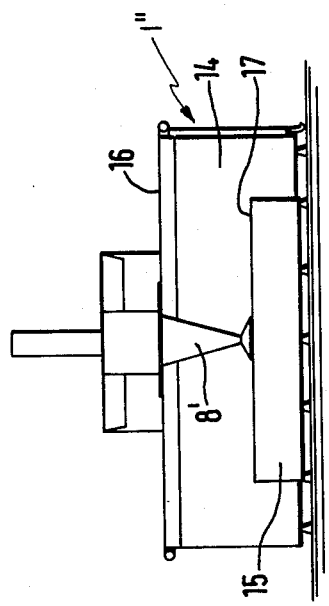
FIG. 5 is a view similar to FIG. 1 of still another embodiment of the invention.

In the measuring machine shown in FIGS. 5 and 6, a basic frame 1" comprises two parts 14 and 15 cast of synthetic resin concrete. In cast parts 14, for example, a straight and supporting guideway of hardened steel for the crossbeam is embedded, while the surface of part 15 is designed as a guide plane for an air cushion support. A crossbeam 7" is supported by a guideway 16 of a cast part 14 and bears through arm 8' against a guideway 17 of a part 15. As to the design of cast parts 14 and 15, substantially the same applies as to the embodiment of FIGS. 1 and 2, only an air cushion support is provided as the backing, because of the considerable weight. In the embodiment of FIGS. 5,6 again, a supporting portion of crossbeam 7" and arm 8' may be formed by a part cast of synthetic resin concrete.

While specific embodiments of the invention have been shown and described in detail to illustrate the application of the principles of the invention, it will be understood that the invention may be embodied otherwise without departing from such principles.

What is claimed is:

1. A coordinate measuring machine comprising a basic frame structure having a steel track, crossbeam means supported on said basic frame structure including a bearing portion supported for traveling on said steel track, and a spindle sleeve carried on said crossbeam means, said basic frame structure comprising at least one cast part of synthetic resin concrete, said steel track being embedded in the cast part and a composition of said synthetic resin concrete being selected, at least adjacent said steel track to have a coefficient of thermal expansion of the concrete which is substantially equal to that of said steel track.

2. A coordinate measuring machine according to claim 1, wherein said bearing portion of said crossbeam means comprises a cast part of synthetic resin concrete.

3. A coordinate measuring machine according to claim 1, wherein said cast parts are provided with cavities.

4. A coordinate measuring machine according to claim 1, wherein said steel track is positively held in place in said cast part of synthetic resin concrete.

5. A coordinate measuring machine according to claim 1, wherein said concrete layer contains color additives having granite-like color.

6. A coordinate measuring machine according to claim 1, including a granite plate embedded in said layer of synthetic concrete.

7. A coordinate measuring machine according to claim 1, wherein said basic frame structure comprises a plurality of assembled parts each cast of synthetic resin and connected to each other with synthetic resin concrete.

8. A coordinate measuring machine according to claim 1, wherein said basic frame structure includes a horizontal base portion defining a measuring table area of synthetic resin concrete having a layer of sythetic resin concrete at the top thereof and a particle size of granular stone material in said concrete of said layer being smaller than that of said concrete of said table area.

9. A coordinate measuring machine according to claim 1, wherein said basic frame structure includes a horizontal base portion having a layer of resin concrete thereon with said steel track embedded therein and including vertically upright spaced apart columns at each end of said horizontal portion, said crossbeam means comprising a headbeam supported on said columns above said horizontal portion, a second crossbeam movable along said headbeam, said headbeam having a steel trackway over which said second crossbeam is movable and a spindle sleeve associated with said second crossbeam, said second crossbeam having an arm portion engageable on said steel trackway.

* * * * *